United States Patent
Han

(10) Patent No.: US 9,735,838 B2
(45) Date of Patent: Aug. 15, 2017

(54) APPARATUS AND METHOD FOR SIMPLIFYING WIRELESS CONNECTION AND DATA SHARING

(71) Applicant: HYUNDAI MOBIS CO., LTD., Seoul (KR)

(72) Inventor: Il Seok Han, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 63 days.

(21) Appl. No.: 14/063,494

(22) Filed: Oct. 25, 2013

(65) Prior Publication Data

US 2015/0035646 A1 Feb. 5, 2015

(30) Foreign Application Priority Data

Aug. 5, 2013 (KR) .................. 10-2013-0092594

(51) Int. Cl.
*H04B 5/00* (2006.01)
*G07C 9/00* (2006.01)
*H04W 76/02* (2009.01)

(52) U.S. Cl.
CPC ....... *H04B 5/0056* (2013.01); *G07C 9/00309* (2013.01); *H04B 5/0031* (2013.01); *G07C 2009/00317* (2013.01); *H04W 76/023* (2013.01)

(58) Field of Classification Search
CPC ...... G07C 2009/00317; G07C 9/00309; H04B 5/0056; H04B 5/0031; H04W 76/023; H04W 4/008; H04W 8/24; H04L 67/16; G08C 17/06

USPC .... 340/5.72, 905, 5.7, 5.61; 455/414.2, 418, 455/41.2, 41.1, 420, 419; 710/106, 105, 710/305, 100, 313
See application file for complete search history.

(56) References Cited

U.S. PATENT DOCUMENTS

| | | | |
|---|---|---|---|
| 2009/0077288 A1* | 3/2009 | Sobelman | H04L 25/0262 710/106 |
| 2010/0332563 A1* | 12/2010 | Fujikawa | G06F 17/30117 707/813 |
| 2011/0105097 A1* | 5/2011 | Tadayon et al. | 455/418 |
| 2011/0275358 A1* | 11/2011 | Faenger | H04W 8/24 455/420 |

(Continued)

FOREIGN PATENT DOCUMENTS

| | | |
|---|---|---|
| CN | 101114901 A | 1/2008 |
| CN | 101533329 A | 9/2009 |

(Continued)

OTHER PUBLICATIONS

Chinese Office Action issued on Mar. 16, 2016 in counterpart Chinese Patent Application No. 201310522265.3 (10 pages, in Chinese).

(Continued)

*Primary Examiner* — Mirza Alam
(74) *Attorney, Agent, or Firm* — NSIP Law

(57) ABSTRACT

Provided are an apparatus and method for simplifying wireless connection and data sharing. In order to simply implement a complicated and difficult function related to vehicle wireless connection via NFC, the apparatus recognizes proximity or contact to a mobile device, transmits head unit wireless connection information to the mobile device, receives connection information from the mobile device, performs connection to the mobile device in an OBB scheme on the basis of the received connection information, and provides an NFC-linked service when the connection to the mobile device is completed.

12 Claims, 9 Drawing Sheets

(56) References Cited

U.S. PATENT DOCUMENTS

| | | | | |
|---|---|---|---|---|
| 2012/0208461 | A1* | 8/2012 | Choi | H04W 4/008 |
| | | | | 455/41.2 |
| 2012/0282906 | A1* | 11/2012 | Frye | H04W 4/04 |
| | | | | 455/414.2 |
| 2012/0282908 | A1 | 11/2012 | Nicolini | |
| 2012/0329388 | A1* | 12/2012 | Royston | H04W 4/008 |
| | | | | 455/41.1 |
| 2013/0015966 | A1* | 1/2013 | Soomro | G08B 25/004 |
| | | | | 340/502 |
| 2013/0084847 | A1* | 4/2013 | Tibbitts | H04W 8/245 |
| | | | | 455/419 |
| 2013/0147638 | A1* | 6/2013 | Ricci | G06F 9/54 |
| | | | | 340/905 |
| 2014/0089492 | A1* | 3/2014 | Nelson | H04L 67/325 |
| | | | | 709/224 |
| 2014/0344420 | A1* | 11/2014 | Rjeili | H04L 43/04 |
| | | | | 709/220 |

FOREIGN PATENT DOCUMENTS

| | | |
|---|---|---|
| CN | 102917337 A | 2/2013 |
| JP | 2012-503243 A | 2/2012 |
| KR | 10-1166351 B1 | 7/2012 |
| KR | 10-2012-0092366 A | 8/2012 |
| KR | 10-1232640 B1 | 2/2013 |
| KR | 10-1241293 B1 | 3/2013 |
| KR | 10-2013-0033611 A | 4/2013 |
| KR | 10-2013-0063604 A | 6/2013 |

OTHER PUBLICATIONS

Chinese Office Action issued on Nov. 7, 2016 in corresponding Chinese Patent Application No. 201310522265.3. (11 pages in Chinese).

Chinese Office Action dated May 3, 2017 in Counterpart Chinese Application No. 201310522265.3 (7 pages in Chinese).

* cited by examiner

APPARATUS AND METHOD FOR SIMPLIFYING WIRELESS CONNECTION AND DATA SHARING

CROSS-REFERENCE TO RELATED APPLICATIONS

This application claims priority under 35 U.S.C. §119 to Korean Patent Application No. 10-2013-0092594, filed on Aug. 5, 2013, the disclosure of which is incorporated herein by reference in its entirety.

TECHNICAL FIELD

The present invention relates to an apparatus and method for simplifying wireless connection and data sharing, and more particularly, to an apparatus and method for simplifying wireless connection and data sharing via near field communication (NFC).

BACKGROUND

Recently, as data is shared between mobile devices in a vehicle through wireless communication connection such as Bluetooth or WiFi, the need to provide a linked service is increasing. However, using the linked service is actually inconvenient for a user because the wireless connection process is complicated.

A related art connection scheme necessarily requires a manual connection process performed by user's operation. Also, the user's operation may have at least several steps when a vehicle AVN/Audio/AVNT system is operated.

However, due to the difficulties in the connection steps, most users neither use wireless Internet connection well, nor know related functions. That is, there is a limitation in that a user cannot exactly understand the Bluetooth or WiFi connection process because the connection process is complicated and a manual for guiding the connection process is written with technical terms, and a user does not try relevant connection-based functions because the user feels difficulties in the beginning.

SUMMARY

Accordingly, the present invention provides an apparatus and method for simplifying wireless connection and data sharing, which can simply implement a complicated and difficult function via NFC in association with wireless connection and mobile device data sharing.

In one general aspect, an apparatus for simplifying wireless connection and data sharing includes: an input unit configured to recognize proximity or contact to a mobile device; a communication unit configured to transmit head unit wireless connection information to the mobile device and receive connection information from the mobile device; and a control unit configured to perform connection to the mobile device on the basis of the received connection information and execute user personalization setting via near field communication (NFC).

In another general aspect, a method of simplifying wireless connection and data sharing includes: recognizing proximity or contact to a mobile device; transmitting head unit wireless connection information to the mobile device; receiving connection information from the mobile device; performing connection to the mobile device on the basis of the received connection information; and providing an NFC-linked service when the connection to the mobile device is completed.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, specific embodiments will be described in detail with reference to the accompanying drawings.

Figure 1:
FIG. 1 is a view showing connection between a vehicle AVN and a mobile device according to the related art.
Figure 2:
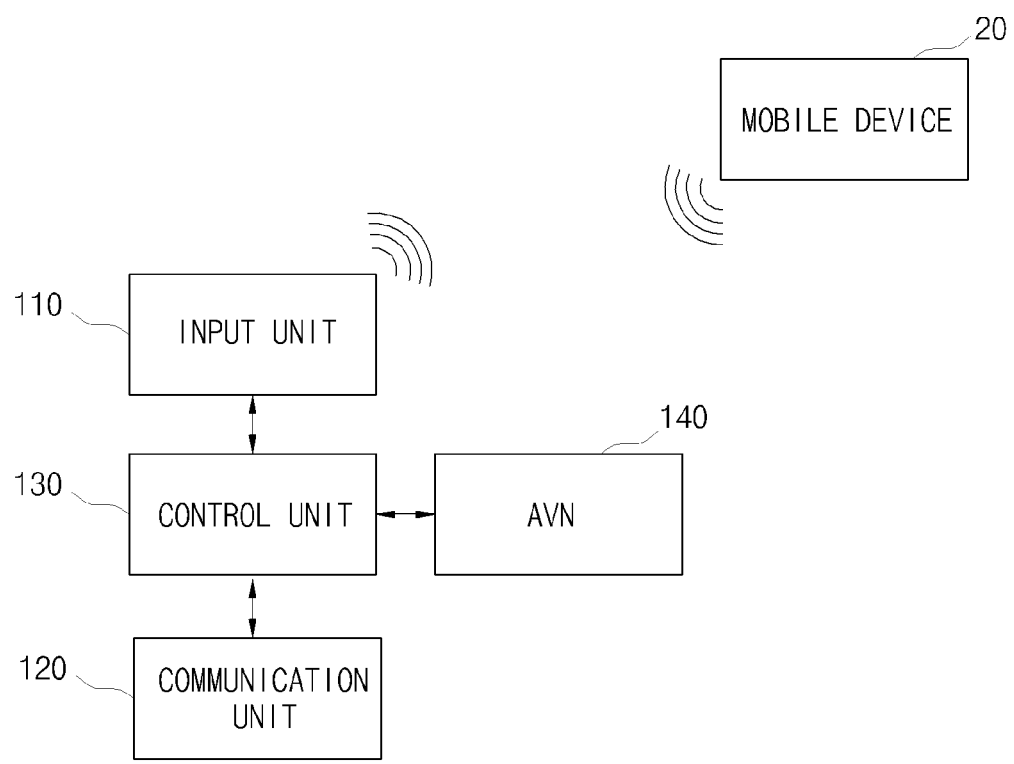
FIG. 2 is a block diagram showing an apparatus for simplifying wireless connection and data sharing according to an embodiment of the present invention.

FIG. 2 is a block diagram showing an apparatus for simplifying wireless connection and data sharing according to an embodiment of the present invention. As shown in FIG. 2, the apparatus for simplifying wireless connection and data sharing includes an input unit 110, a communication unit 120, a control unit 130, and an AVN 140.

The input unit 110 recognizes proximity or contact to the mobile device 20. Specifically, the input unit 110 recognizes proximity or contact to the mobile device 20 through an NFC R/W device.

The communication unit 120 transmits head unit wireless connection information to the mobile device 20 via NFC communication and receives connection information from the mobile device 20. The mobile device 20 automatically performs wireless connection on the basis of this information. Specifically, the communication unit 120 transmits head unit wireless connection information to the mobile device 20 in an out-of-band (OOB) scheme and receives connection information from the mobile device 20.

The data transmission schemes include an in-band scheme and an out-of-band scheme.

First, the in-band scheme is a scheme where control data and general data share a medium, in which control data is transmitted and received in the same band (physical transmission medium) as data to be transmitted and received, that is, control data in addition to general data is transmitted through a communication medium such as a system internal bus or Ethernet. Accordingly, sufficient bandwidth should be provided in order to decrease transmission loss and increase transmission rate when the general data is transmitted.

The out-of-band scheme is a scheme where a separate path for processing the control data is dedicatedly used. Accordingly, the out-of-band scheme may implement an internal protocol while a load is not applied to a general data flow.

The control unit 130 delivers information to a head unit and the mobile device wireless connection apparatus on the basis of the connection information received via NFC to perform connection to the mobile device 20 and communicates data between devices via NFC communication to set user personalization setting. The user personalization setting is to set the AVN system 140 corresponding to user preference. The setting of the AVN system 140 will be described in detail below.

The control unit 130 executes at least one of function operation setting, multimedia sharing, and data synchronization with the mobile device 20 via NFC communication.

Also, the control unit 130 automatically executes a function that is used by a user a number of times greater than a predetermined threshold value in a certain time period, via NFC communication. For example, if the user uses an English conversation mp3 file stored in the mobile device 20 from 6 a.m. to 7 a.m. on weekdays (Monday to Friday) for two months a number of times equal to or greater than a predetermined threshold value (for example, 3 days a week), the control unit 130 automatically executes a function of reproducing the English conversation mp3 file.

The control unit 130 transmits an authentication certificate and login information stored in the mobile device 20 via NFC communication to execute online service auto-login. For example, through auto-login to an online service (for example, BlueLink serviced by Hyundai motors, Inc.), a user may control remote starting, an air conditioner, and a heater of a vehicle even in home or office, immediately check a parking position on a map using a smartphone even when the user has difficulty in remembering the parking position, and execute door lock control using a smartphone even when the user has difficulty in remembering whether to lock a vehicle door.

The control unit 130 displays automatic road navigation through the AVN through linkage with the mobile device 20 or content stored in the mobile device 20. Specifically, the mobile device 20 executes the automatic road navigation program and stores the searched position information (POI). In addition, the position information (POI) about a building, a store, and a road displayed on a screen of the mobile device 20 is transmitted via NFC communication to the AVN 140 equipped in the vehicle, and then displayed on the AVN 140.

Furthermore, an automatic road navigation broadcasting executed in the mobile device 20 is output to the AVN 140, and thus the user can comfortably listen to the automatic road navigation broadcasting with a bigger speaker instead of a small one, thereby enhancing user convenience.

Next, the mobile device 20 reproduces multimedia content such as video, and the reproduced multimedia content is displayed on the AVN 140. For example, a process of simplifying wireless connection is performed when the mobile device 20 reproduces a movie file (file extension .avi) and then comes into contact with an NFC R/W device. In this case, a movie video packet is transmitted from the mobile device 20 to the AVN 140, and thus a movie scene is reproduced through the AVN 140. Accordingly, the user can watch the movie on a bigger screen of the AVN 140 instead of on a small screen of the mobile device 20, thereby feeling greater satisfaction when reproducing the video.

To provide a description of the reproduction of the content stored in the mobile device while providing a NFC-linked service through the NFC R/W device, the NFC-linked service is performed by communicating data via NFC communication through the contact of the NFC R/W device.

However, in a large-scale streaming data transmission such as digital living network alliance (DLNA), simple information such as initial file information or reproduction location information is transmitted via NFC communication, and on the basis of the information, a head unit media player is allowed to receive binary (raw) data of a file for actual reproduction through Bluetooth or WiFi. This is why the NFC communication has very slow data transfer rate (106 to 424 kbps), compared with Bluetooth (3 Mbps) or WiFi (11 Mbps).

Other than large-scale data (DLNA streaming file data), a small amount of simple information is transmitted or received by tagging the information to the NFC R/W device. That is, data parsing is performed on the data communicated via NFC communication in an NFC stack, and then relevant service is provided.

Figure 3:
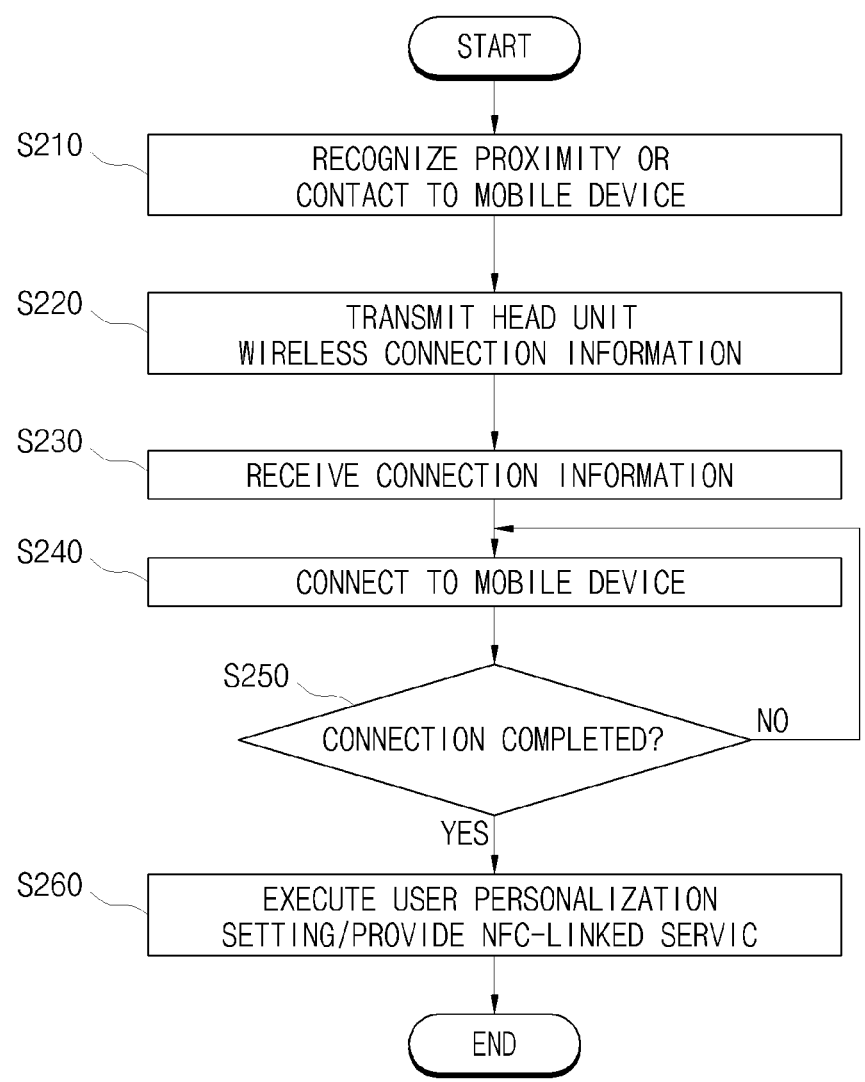
FIG. 3 is a flowchart showing a method of simplifying wireless connection and data sharing according to an embodiment of the present invention.

FIG. 3 is a flowchart showing a method of simplifying wireless connection and data sharing according to an embodiment of the present invention.

As shown in FIG. 3, first, the method recognizes proximity or contact to the mobile device 20 in operation S210. Specifically, the proximity or contact to the mobile device 20 is recognized through the input unit 110.

Next, the method transmits head unit wireless connection information (information about a vehicle AVN/AUDIO/AVNT device) to the mobile device 20 via NFC in operation S220. Specifically, the head unit wireless connection information is transmitted to the mobile device 20 through the communication unit 120.

Next, the method receives connection information from the mobile device 20 in operation S230. Specifically, the connection information is received to the mobile device 20 through the communication unit 120.

Subsequently, the method performs connection to the mobile device 20 on the basis of the received connection information in operation S240.

Then, the method checks whether the connection to the mobile device 20 is completed in operation S250. If the connection is not completed, the method proceeds to the operation of performing connection to the mobile device 20.

The control unit 130 checks whether the connection is completed by checking the state of head unit wireless connection.

Last, when the connection is completed, a service using a relevant wireless device may be provided. Accordingly, the method executes user personalization setting or provides an NFC-linked service in operation S260. Specifically, at least one of vehicle AVN/AUDIO/AVNT head unit setting, text information input, security and user authentication, electronic payment, and data transmission to the mobile device 20 is provided through the control unit 130.

Alternatively, the user personalization setting may be executed through the control unit 130.

Figure 4:
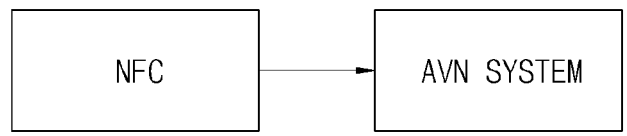
FIG. 4 is a view showing an AVN system setting via NFC communication according to an embodiment of the present invention.

FIG. 4 is a view showing an AVN/AVNT head unit system setting via NFC communication according to an embodiment of the present invention.

As shown in FIG. 4, if the mobile device 20 is brought into contact with the NFC R/W device, it is possible to share data with the mobile device and set an AVN system through the mobile device 20.

Specifically, for the video setting of the AVN system through the mobile device 20, screen brightness, a screen color, screen environment setting, screen icon setting, and a video reproduction method may be set. For the audio setting, a sound's volume, a sound output method, use of an equalizer, and use of a 3D stereophonic sound may be set.

Figure 5:
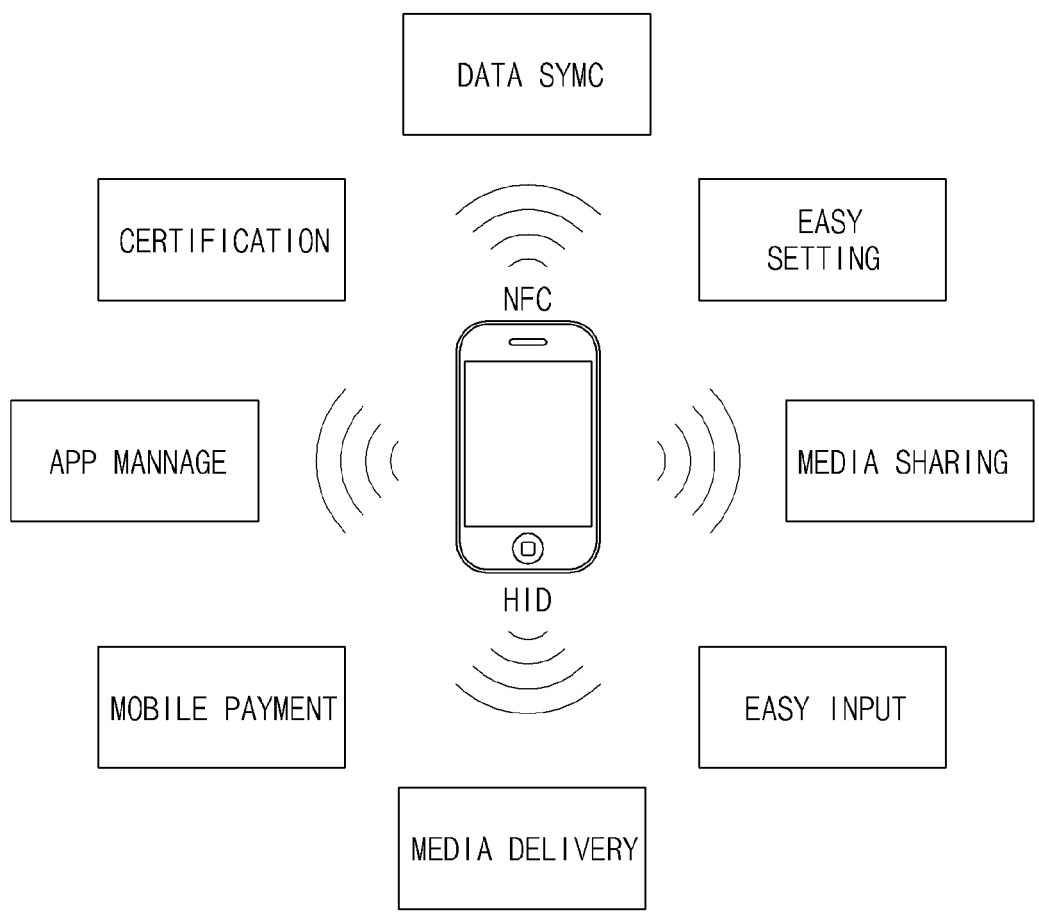
FIG. 5 is a view showing provision of an NFC-linked service according to an embodiment of the present invention.

FIG. 5 is a view showing provision of NFC-linked service according to an embodiment of the present invention.

As shown in FIG. 5, first, if wireless Internet is activated through the NFC connection, a variety of wireless external devices may easily connect to the wireless Internet.

Operation setting of a function frequently used by a user is allowed. For example, the user may store a preferred application or function in the mobile device 20 and then easily execute the operation through the NFC connection.

Next, multimedia content sharing is allowed. A music and video file may be shared in real time via NFC communication or digital living network alliance (DLNA), which is an international specification for freely transmitting digital content stored in a cell phone, a personal computer (PC), a digital computer, etc. to a TV, a printer, etc. through a home network.

Smartphone data synchronization is allowed. Specifically, only by contacting the smartphone with the NFC R/W device, personal data including a contact book and a message and content including a picture video and a music, which are stored in a smartphone, may be transmitted, and data between devices may be synchronized.

Furthermore, head unit setting is allowed. The head unit setting may be reset, and the setting information may be contained in the mobile device 20.

Text information input is allowed. Text information (for example, destination, URL, etc.) that can hardly be input in a head unit can be allowed to be input in a keyboard or list of the mobile device 20, thereby solving conventional input inconvenience.

Security and user authentication is allowed. Specifically, the user authentication may be performed by displaying and checking user authentication information via NFC communication.

Electronic payment is allowed. Specifically, through a mobile credit card issued in a smartphone, an application operated in a head unit may be purchased, and also support for other service payments is allowed.

Also, smartphone data upload or download is allowed, and support for Android beam function is allowed. Specifically, the support for Android beam function may be implemented between two devices by transmitting a video, a music, a document file, etc. stored in a mobile device (for example, smartphone) to the AVN 140 through the apparatus for simplifying wireless connection and data sharing.

Android Beam

The Android beam is a feature to allow applications registered in Browser/Contact/Map/Google Market to be communicated between two devices which support near field communication. If one device is placed to the other back to back after any function (for example, contact book, browser execution, map execution, YouTube video, etc.) is executed, Touch to Beam is displayed on a screen and then touching the screen performs transmission.

Also, the Android beam is communication between devices supporting the same function, and thus the setting states of the both devices should be checked.

Figure 6:
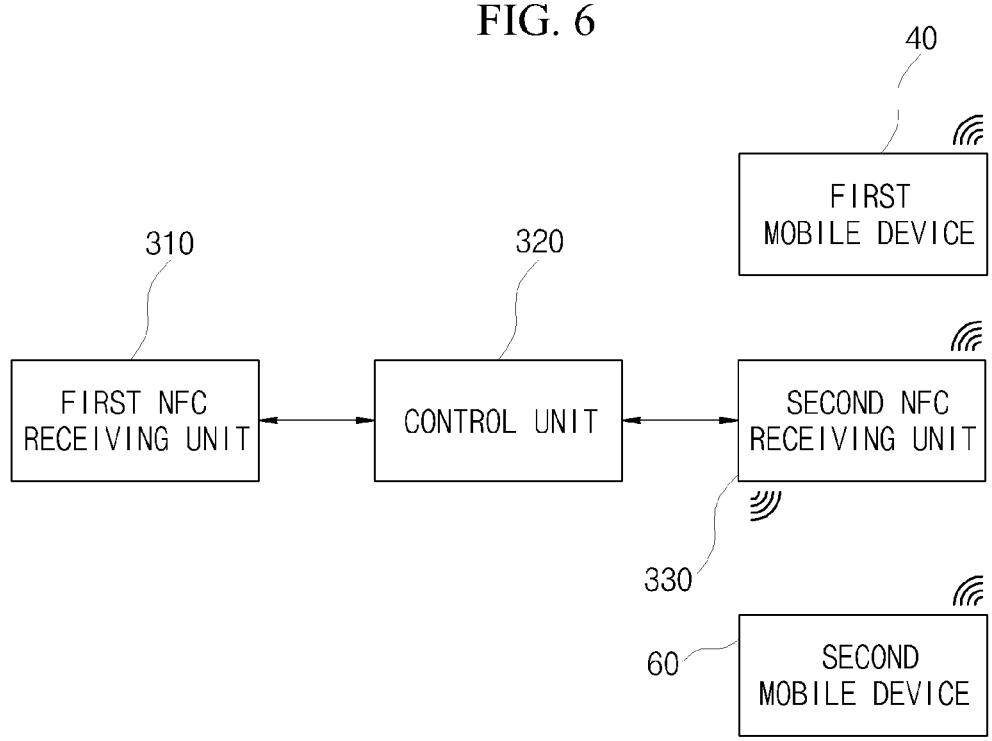
FIG. 6 is a block diagram showing an apparatus for simplifying wireless connection and data sharing according to an embodiment of the present invention.

FIG. 6 is a block diagram showing an apparatus for simplifying wireless connection and data sharing according to an embodiment of the present invention.

As shown in FIG. 6, the apparatus for simplifying wireless connection and data sharing includes a first NFC receiving unit 310, a control unit 320, and a second NFC receiving unit 330. The apparatus for simplifying wireless connection and data sharing may operate in linkage with the first mobile device 40 having previously stored file information including a vehicle key function.

The first NFC receiving unit 310 acquires a first NFC tag input from the first mobile device 40. Specifically, when a user brings his/her first mobile device 40 in contact with the first NFC receiving unit 310, the first NFC receiving unit 310 acquires a first NFC tag input from the first mobile device 40.

The second NFC receiving unit 330 acquires a second NFC tag input from the first mobile device 40. Specifically, when a user brings his/her first mobile device 40 in contact with the second NFC receiving unit 330, the second NFC receiving unit 330 acquires a second NFC tag input from the first mobile device 40.

The control unit 320 opens a vehicle door when the user is authorized through the first NFC tap input, and provides the NFC-linked service in response to the second NFC tag input. The NFC-linked service includes, for example, starting the vehicle, downloading a hotel key via NFC communication, reproducing content, which is reproduced in a mobile device, in an AVN, and sharing one company vehicle with several persons.

Figure 7:
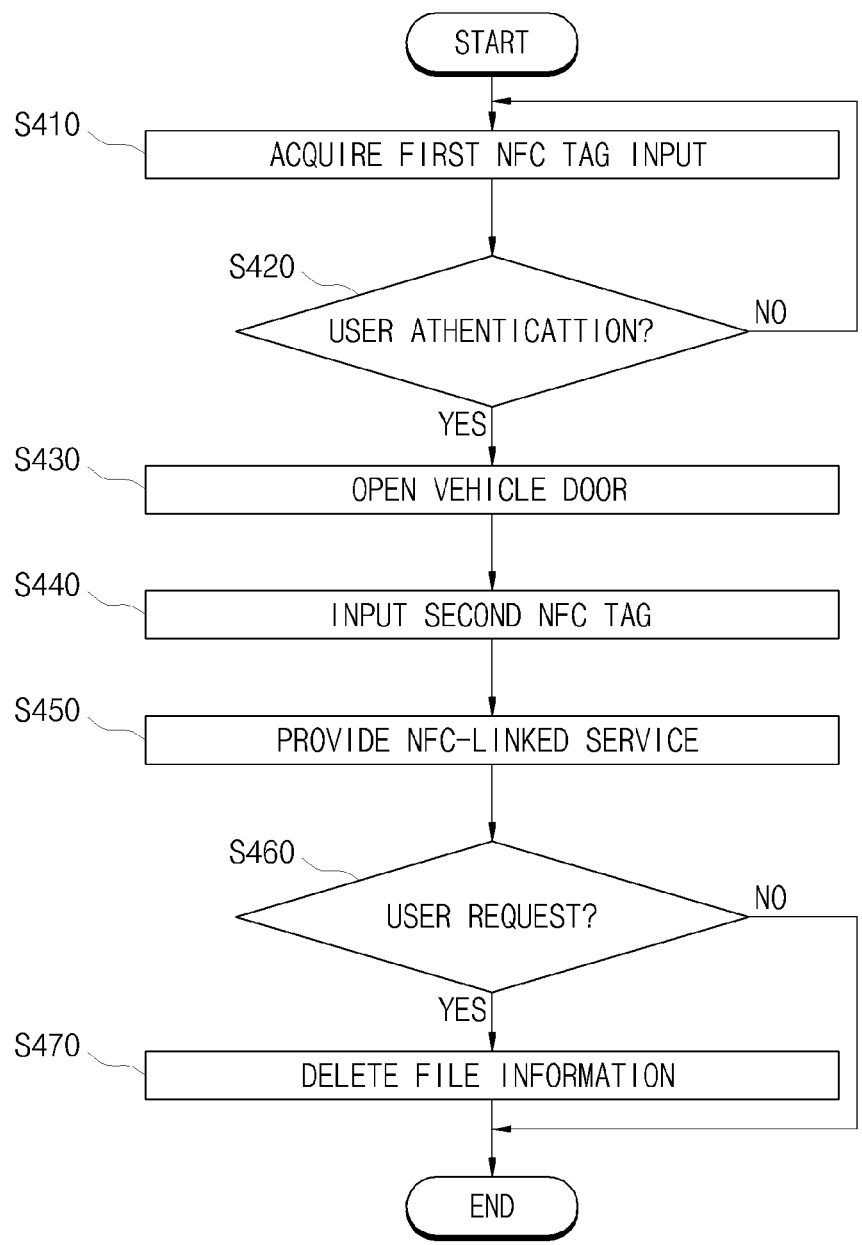
FIG. 7 is a flowchart showing a method of simplifying wireless connection and data sharing according to an embodiment of the present invention.

FIG. 7 is a flowchart showing a method of simplifying wireless connection and data sharing according to an embodiment of the present invention.

As shown in FIG. 7, first, the method acquires a first NFC tag input in operation S410. Specifically, the first NFC input is acquired from the first mobile device 40 through the first NFC receiving unit 310.

Next, the method checks user authentication in operation S420.

Next, the method opens a vehicle door when the user is authorized in operation S430. Specifically, after file information stored in the first mobile device 40 is read through the first NFC receiving unit 310 equipped in the vehicle, the control unit 320 performs the user authentication if it is determined that the file information stored in the first mobile device 40 is the same as pre-stored file information.

Subsequently, the method acquires the second NFC tag input in operation S440. Specifically, the second NFC tag input is acquired from the first mobile device 40 through the second NFC receiving unit 330.

Also, the method provides an NFC-linked service in response to the second NFC tag input in operation S450.

Specifically, when a user brings his/her first mobile device 40 in contact with the second NFC receiving unit 330, the vehicle may be powered on and thus started.

Figure 9:
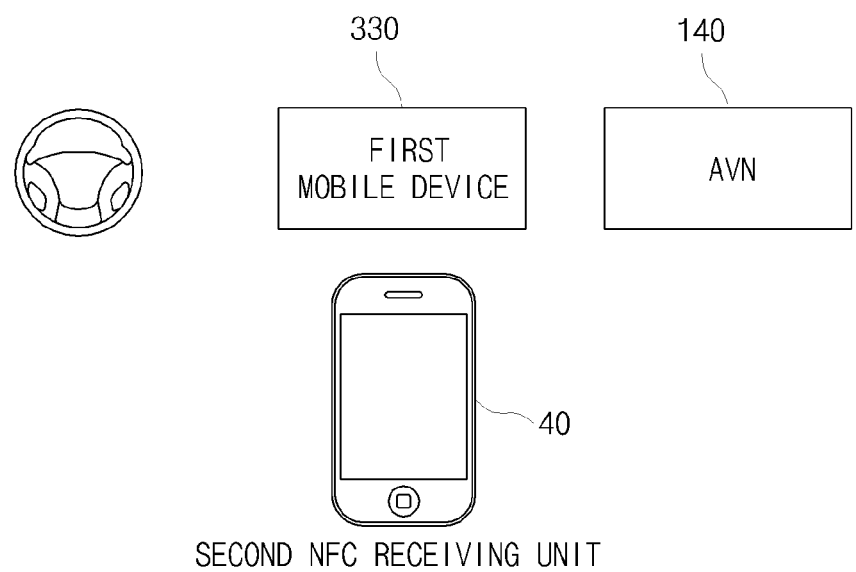
FIG. 9 is a view showing that content reproduced in a first mobile device is reproduced in an AVN according to an embodiment of the present invention.

According to another embodiment of the present invention, content reproduced in the first mobile device 40 may be reproduced in the AVN 140 of the vehicle. Here, the content reproduction time point of the AVN 140 may be synchronized with that of the first mobile device 40. In FIG. 9, its detailed description is provided.

According to still another embodiment of the present invention, in association with an NFC-linked service, key file information (for example, hotel key) may be downloaded from an external server in a vehicle and transmitted to a smartphone. Specifically, the key file information is downloaded from the external server (for example, a hotel server), and transmitted to the first mobile device 40.

Accordingly, when a user drives a vehicle to a hotel, the user may go to his/her room without cumbersome check-in at the hotel's lobby and open a hotel room door via NFC communication between the first mobile device 40 and the hotel room door.

According to another embodiment of the present invention, several workers "A", "B", "C", and "D" may share one company vehicle. Specifically, a second mobile device tag input is acquired from the first mobile device 40. When a user agreement is acquired, the same file information as pre-stored in the first mobile device 40 is transmitted from the second NFC receiving unit 330 to a second mobile device 60.

For example, worker "A" may be authenticated to start the vehicle via NFC communication between the first mobile device 40 and the first and second NFC receiving units 310 and 330. Worker "B" acquires the consent of worker "A" in order to receive authentication and start the vehicle and transmits to the second mobile device 60 of worker "B" the same file information as pre-stored in the first mobile device 40 from the second mobile device 60 through the second NFC receiving unit 330.

Accordingly, it may be convenient for several workers to share one company vehicle through a plurality of smartphones and the second NFC receiving unit 330.

According to another embodiment of the present invention, several workers may share one company vehicle, and when one of the workers loses his/her smartphone a third person acquires the smartphone, the file information may be deleted for the security reason.

Specifically, the method checks whether a user request is acquired from an external server in operation S460. Specifically, when worker "B" loses his/her smartphone and the third person acquires the smartphone, worker "B" may request the external server to delete the user. For example, worker "B" requests user deletion by connecting to an external server, or over the phone. The apparatus for simplifying wireless connection and data sharing checks whether the user request is acquired from the external server.

Finally, the method deletes the file information pre-stored in the vehicle when the user request is acquired in operation S470. Specifically, the file information pre-stored in the vehicle is deleted through the control unit 320. Accordingly, if the file information about user authentication information, NFC-linked service information, vehicle starting information, etc. which is pre-stored in the vehicle is deleted through the control unit 320, a third person who has acquired a smartphone cannot use the smartphone.

Figure 8:
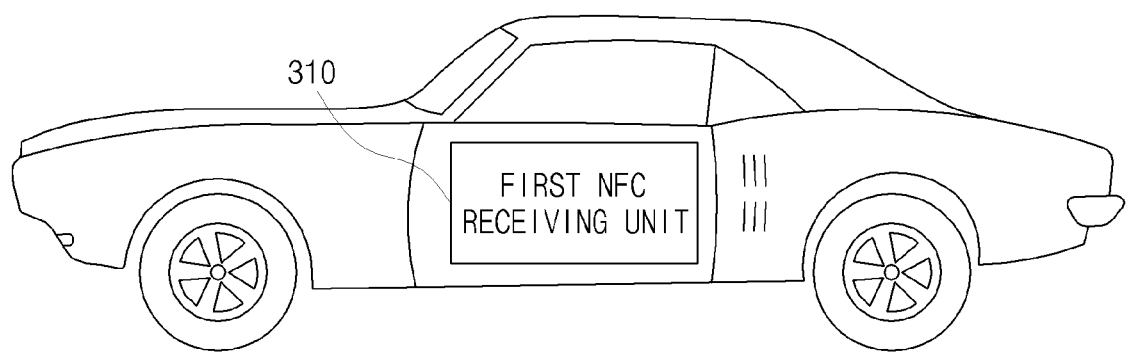
FIG. 8 is a view showing a vehicle equipped with a first NFC receiving unit according to an embodiment of the present invention.

FIG. 8 is a view showing a vehicle equipped with a first NFC receiving unit according to an embodiment of the present invention. As shown in FIG. 8, the first NFC receiving unit 310 may be equipped in the vehicle door, The user authentication is performed between the first NFC receiving unit 310 and the first mobile device 40, and the vehicle door is opened when the user is authenticated.

FIG. 9 is a view showing that content reproduced in a first mobile device is reproduced in an AVN according to an embodiment of the present invention.

As show in FIG. 9, when the second NFC receiving unit 330 acquires the second NFC tag input from the first mobile device 40, the content reproduced in the first mobile device 40 is reproduced in the AVN 140. For example, the reproduction time point of the AVN 140 is synchronized with that of the first mobile device and thus if a video of 50 minutes is reproduced in the first mobile device for around 4 minutes 30 seconds, the video is also reproduced in the AVN 140 from the time point of 4 minutes 30 seconds. Accordingly, the video can be reproduced not from the beginning but the time point when the user has viewed the video, thus providing the user with convenience.

The present invention recognizes proximity or contact to a mobile device, transmits head unit wireless connection information to the mobile device, receives connection information from the mobile device, connects to the mobile device on the basis of the received connection information, and then executes user personalization setting via NFC communication.

Accordingly, it is possible to simplify wireless connection and perform linkage with the mobile device, thereby providing convenience to a user. Therefore, it is possible to overcome the limitation that the Bluetooth or WiFi connection is complicated, a manual for guiding the connection is written with technical terms, and thus a user does not try the connection at the beginning such that the user cannot use relevant connection-based functions.

Also, it is possible to simply provide a service provided by a vehicle after the wireless connection and to link data between devices via NFC to execute user personalization setting or NFC-linked service, thereby providing convenience to the user.

The above-described subject matter of the present invention is to be considered illustrative and not restrictive, and it should be understood that numerous other modifications and embodiments can be devised by those skilled in the art that will fall within the spirit and scope of the principles of the present invention. Accordingly, the embodiments of the present invention are to be considered descriptive and not restrictive of the present invention, and do not limit the scope of the present invention. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of simplifying wireless connection and data sharing comprising:
   recognizing proximity or contact to a mobile device;
   transmitting head unit wireless connection information to the mobile device;
   receiving connection information from the mobile device;

performing connection to the mobile device on the basis of the received connection information; and providing an NFC-linked service in response to the connection to the mobile device being completed, and in response to recognition of a function of the mobile device being previously executed by a user a number of times equal to or greater than a predetermined threshold value in a predetermined time period, automatically executing the same function.

2. The method of claim 1, wherein the connection to the mobile device is performed in response to the connection not being completed.

3. The method of claim 1, wherein the providing of the NFC-linked service comprises providing at least one of head unit setting, text information input, and security and user authentication.

4. The method of claim 1, wherein the providing of the NFC-linked service comprises providing at least one of electronic payment and data transmission to the mobile device.

5. A method for simplifying wireless connection and data sharing, which uses a first mobile device having pre-stored file information including a vehicle key function, the method comprising:

opening a vehicle door in response to a user being authorized through a first NFC tag input acquired from a first NFC receiving unit;

acquiring, from a second NFC receiving unit, a second NFC tag input, in response to contact with the first mobile device; and providing an NFC-linked service in response to the second NFC tag input, wherein the opening of a vehicle when a user is authorized comprises reading the file information stored in the first mobile device through a first NFC receiving unit equipped in the vehicle, and in response to determining that the file information is the same as the pre-stored file information, authenticating the user.

6. The method of claim 5, wherein the providing of an NFC-linked service comprises starting the vehicle.

7. The method of claim 5, wherein the providing of an NFC-linked service comprises reproducing content reproduced in the first mobile device, in an AVN of the vehicle.

8. The method of claim 7, wherein a content reproducing time point of the AVN is synchronized with that of the first mobile device.

9. The method of claim 5, wherein the providing of an NFC-linked service comprises:

downloading key file information from an external server; and transmitting the key file information to the first mobile device.

10. The method of claim 5, wherein the providing of an NFC-linked service comprises:

acquiring a second mobile device tag input; and transmitting, to the second mobile device, file information that is same as file information pre-stored in the first mobile device in response to a user agreement being acquired.

11. The method of claim 5, further comprising deleting file information pre-stored in the vehicle in response to a user request is acquired from an external server, in response to the providing of an NFC-linked service.

12. The method of claim 7, wherein the content is reproduced in the AVN for a second duration that is dependent on a first duration that the content is reproduced in the first mobile device.

* * * * *